Dec. 9, 1947.  R. SUCZEK  2,432,216
UNIVERSAL JOINT
Filed March 19, 1943
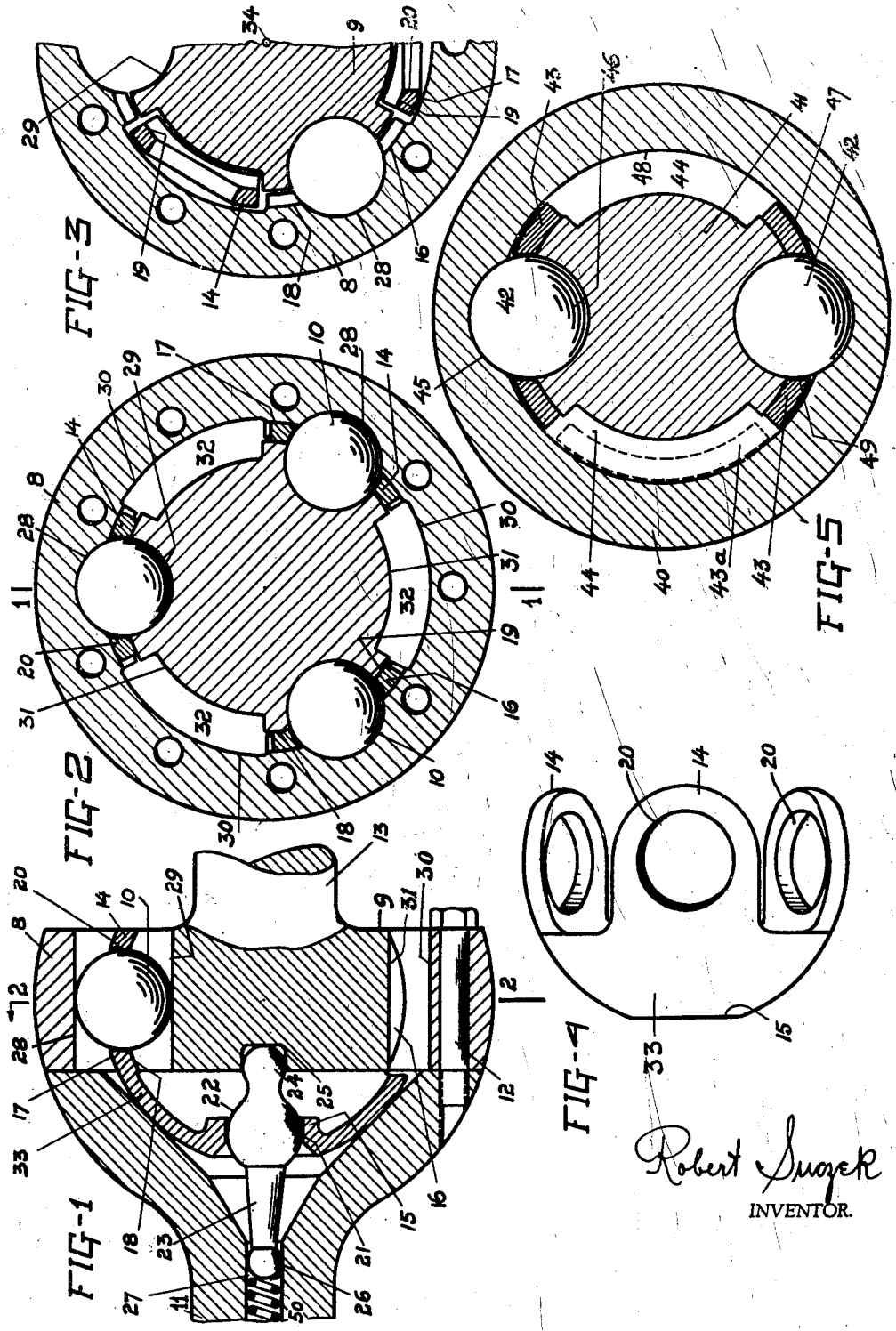
Robert Suczek
INVENTOR.

Patented Dec. 9, 1947

2,432,216

UNITED STATES PATENT OFFICE 2,432,216

UNIVERSAL JOINT

Robert Suczek, Grosse Pointe, Mich.

Application March 19, 1943, Serial No. 479,685

5 Claims. (Cl. 64—21)

This invention relates to universal joints of the constant velocity type in which the torque is transmitted by balls from one shaft to another. By a constant velocity universal joint is understood a joint in which the speed ratio between the driving and the driven members remains constant in all portions of the cycle of each rotation of shafts, no matter what the relative angular position of members and their axes may be.

And my invention relates to such joints in which the torque is transmitted from one member to the other by balls, which move in meridian grooves. Such grooves may have various shapes such as curved in a circular arc or they may be straight and cylindrical, which latter form I prefer for reasons of manufacture.

My invention is applicable to, and of particular advantage in joints for large angularities, where the axes of rotation of the two joint members may swing from their straight line position to both sides up to 38 degrees, an angle which is required in joints for use in automotive vehicles when steered wheels are driven by the power of the engine.

It is a well known fact that balls of joints through which the torque is transmitted are under such high load that they are pressed into the surface of their races.

The depth of the impression in the race made by the ball under load depends among others on the size of the ball; that is: the greater the ball the smaller will be the depth of the impression and the deformation of the ball under similar load condition.

To take advantage of this fact it is therefore desirable to use large balls; the greater the better.

However it is obvious that the ball size is limited by the space available for a joint transmitting a given torque, and also that the greater the balls for a given outside diameter of the joint, the lesser number of balls may be used, thus increasing the share of torque transmitted by each ball.

Thus the object of my invention is to use the largest balls possible, thereby reducing their number in the joint and on such fewer balls use all the accuracy possible during the process of production to insure good fits between the balls and their grooves and to produce a ball cage that will be easy to manufacture, easy to install and at the same time will be sufficiently strong to withstand the great loads which it has to carry, while performing the work of pushing back and forth the balls in their respective grooves when the joint members are at an angle to each other while rotating.

My invention consists in providing the inner and the outer torque member with two kinds of grooves (or at least the inner member). First, both members must be provided with grooves for receiving the torque transmitting balls, and second, at least one of the members (the inner member) is provided with another series of grooves, located between the first mentioned grooves for inserting the ball cage. This ball cage, when in operative position is located between the inner and the outer members and is provided with cylindrical holes fitting around the balls.

My invention also consists in the form of the cage, which is provided with lobes equal in number to the number of balls used in the joint.

The purpose of my invention is to produce a joint which may have the minimum number of balls of the largest size possible with a given size of joint, which will be cheap to manufacture, and in which the balls will be moving in straight cylindrical grooves of the joint members and in a straight cylindrical hole of the ball retainer.

Another purpose of this invention is to produce a simple one-piece-cage of sufficient strength and rigidity, cheap to manufacture and easy to assemble.

With these and other advantages and objects of my invention in view, together with means whereby the same may be carried out, my invention consists in the arrangement, construction and combination of various parts of my new device and method of operation as described in the following specification, claimed in the claims and illustrated in the accompanying drawings in which:

Fig. 1 is a longitudinal section through a joint according to my invention.

Fig. 2 is a cross section along line 2—2 of Fig. 1, showing the joint completely assembled and the members in operative engagement.

Fig. 3 is a cross section through the joint in which the ball retainer (cage) is in an intermediate position during the process of assembling the joint.

Fig. 4 is a view of the cage as it is used in the Figures 1, 2 and 3, according to my invention.

Fig. 5 is a cross section of another joint which has only 2 balls for torque transmission.

In Figs. 1, 2 and 3 numeral 8 represents the outer member and 9 the inner member of a joint with the balls 10 (three in number). Member 8 is attached for torque transmission to shaft 11 by screws 12, and member 9 forms a solid unit with the other shaft 13.

Located between the members 8 and 9 are the cage lobes 14 (see also Fig. 4) which form a solid unit with the cage hub 15.

The outer member 8 is provided on its inside with spherical segmental surfaces 16 fitting closely to the outer spherical surfaces 17 of the cage lobes 14.

The inner member 9 is provided with spherical, segmental surfaces 18 fitting to the inner spherical surfaces 19 of the cage lobes 14. Thus the cage lobes 14 fit into the spherical annular segmental spaces between the inner and the outer members and are provided with round cylindrical holes 20 into which the balls 10 are closely but slidably fitted.

Hub 15 of the cage is provided with a hole 21 into which is slidably fitted the ball 22 of the pilot pin 23. The right hand ball 24 of the pilot pin is journaled in the inner member 9 at 25, and the left hand ball 26 of the pilot pin is slidably fitted in a bore 27 of the shaft 11 and is loaded by a coil spring 50, of which only a portion is shown, tending to move the pin 23 towards the right, to keep it in permanent engagement with bearing 25 of the inner member 9.

Outer member 8 is provided with straight cylindrical meridian grooves 28 and the inner member 9 with similar straight cylindrical meridian grooves 29 corresponding to the ball grooves 28 in such a way that into each pair of grooves one of the balls will fit without play or binding.

The reason why I prefer straight cylindrical grooves in both members is because they can be drilled and finished in both members simultaneously in one operation, and thus can be made to fit the balls with the utmost accuracy which is most essential for quiet operation, for high efficiency and for long life.

In order to be able to mount the spherical lobes 14 of the cage between the spherical surfaces of the inner and the outer member into the spherical shaped annulus, I provide the outer member 8 with a group of inner grooves 30 and the inner member 9 with a group of outer grooves 31, which grooves form in pairs cylindrical segmental spaces 32 when the inner member and the outer member are axially aligned as shown in Fig. 1.

In order to assemble the cage with the inner and outer members, the lobes of the cage 33 are placed into the spaces 32 as shown in Fig. 3, and thereafter the cage is turned into the annular spherical space between surfaces 16 and 18, by rotating the cage about its center 34.

In Fig. 5 I have shown a joint according to my invention in cross section with only two balls to transmit the torque, while in Figs. 1, 2, 3 and 4 a joint is illustrated with 3 balls.

In Fig. 5, numeral 40 indicates the outer member, 41 is the inner member, 42 are the balls for transmitting the torque from one of the members to the other and 43 are the cage lobes.

In this figure I have indicated in dotted lines the location of a lobe 43a in the space 44 which it has to assume before it is slipped between the outer and the inner member into its operative position 43. It should be understood that although I prefer the ball races 45 and 46 in the outer and inner member to be straight and cylindrical, they could be also made curved, without changing the scope and spirit of my invention, neither is my invention limited to any particular number of balls in one joint.

Furthermore it is not necessary that the inner surface of the outer member be spherical. My joint according to this invention, will operate and transmit the velocity uniformly even if this inner surface is cylindrical instead of spherical.

And this inner surface of the outer member does not need to be of the size of the outer spherical surface of the cage but may be greater so that there will be a small clearance between the cage and the outer member. In such a case the cage and the inner member rest on the balls, and the balls will not only center the inner member to the outer member but will also center the cage in relation to both members. This is due to the fact that the cylindrical holes in the cage in which the balls are located, are drilled central to the concentric spheres of the cage.

I have indicated this design in Fig. 5. There the outer spherical surface 47 of the cage 43 has a clearance towards the inner surface 48 of the outer member 40.

It should also be noted that the holes 49 and 20 in cages 43 and 33 respectively are cylindrical and that their axes meet in the center of the spherical surface of the cages.

Thus, while the race grooves in both members, the outer and the inner member of a joint, are cylindrical and parallel to the axes of rotation of the respective members, the cylindrical holes in the cages, according to my invention, are perpendicular to the axis of the cage.

It should be understood that it is part of this invention that the holes for receiving the balls in the cage are cylindrical and closely fitted around the balls.

What I claim is:

1. In a universal joint comprising an inner and an outer member for torque transmission from one of the members to the other, corresponding ball receiving race grooves in said members, balls in said race grooves for torque transmission, means for regimenting and retaining the balls in said race grooves, and grooves in the inner member located between its race grooves for inserting the ball retaining means between the outer and the inner member, the inserting grooves being straight.

2. A universal joint for transmitting rotation and torque from one shaft to another and comprising an inner member surrounded by an outer member and coupled together for torque transmission by balls moving in corresponding grooves of the members, one of the members being attached to one shaft for rotation the other member being attached to the other shaft also for rotation, the inner member having on its outer part a spherical surface portion concentric to its shaft, and a ball retainer surrounding said spherical surface and provided with cylindrical round holes to receive the balls.

3. A universal joint having two torque transmitting rotatable members with cylindrical grooves for receiving torque transmitting spherical balls, a ball retainer provided with cylindrical holes, the cylindrical grooves in the members being parallel to the respective axes of rotation of the members, and the longitudinal axis of the cylindrical holes of the retainer being located radially with respect to an axis of the ball retainer sphere.

4. In a universal joint for torque transmission by balls from one member to another, the members having corresponding grooves for receiving said balls, ball retaining means with spherical surfaces and with cylindrical apertures for receiving the balls, the members being provided with additional grooves for inserting the spherical surfaces of the retaining means between the two members.

5. In a universal joint for torque transmission by balls from one member to another, said members having corresponding grooves for receiving said balls, ball retaining means with spherical surfaces, said surfaces fitting adjacently to spherical surfaces of the members, the spherical surfaces of the members being each provided with another set of grooves for inserting the retainer between the members, the inserting grooves being straight.

ROBERT SUCZEK.

REFERENCES CITED

The following references are of record in the file of this patent:

UNITED STATES PATENTS

| Number | Name | Date |
|---|---|---|
| 2,046,584 | Rzeppa | July 7, 1936 |
| 2,352,776 | Dodge | July 4, 1944 |
| 2,182,455 | Smith | Dec. 5, 1939 |
| 1,916,442 | Rzeppa | July 4, 1933 |
| 2,010,899 | Rzeppa | Aug. 13, 1935 |
| 2,047,660 | Anderson | July 14, 1936 |
| 1,665,280 | Rzeppa | Apr. 10, 1928 |

FOREIGN PATENTS

| Number | Country | Date |
|---|---|---|
| 384,274 | Great Britain | 1931 |